(12) United States Patent
Iwazaki

(10) Patent No.: US 8,310,523 B2
(45) Date of Patent: Nov. 13, 2012

(54) PLUG-IN TO ENABLE CAD SOFTWARE NOT HAVING GREATER THAN 180 DEGREE CAPABILITY TO PRESENT IMAGE FROM CAMERA OF MORE THAN 180 DEGREES

(75) Inventor: Koki Iwazaki, San Marcos, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 666 days.

(21) Appl. No.: 12/548,705

(22) Filed: Aug. 27, 2009

(65) Prior Publication Data

US 2011/0050844 A1    Mar. 3, 2011

(51) Int. Cl.
*H04N 7/00* (2006.01)
(52) U.S. Cl. .............. 348/36; 348/148; 348/E7.001; 348/E7.077
(58) Field of Classification Search .............. 348/36, 348/148, E7.001, E7.077
See application file for complete search history.

(56) References Cited

U.S. PATENT DOCUMENTS

| | | | |
|---|---|---|---|
| 6,002,430 A * | 12/1999 | McCall et al. | 348/207.99 |
| 6,449,103 B1 * | 9/2002 | Charles | 359/725 |
| 6,538,663 B2 * | 3/2003 | Kamei | 345/635 |
| 6,556,783 B1 * | 4/2003 | Gelphman | 396/20 |
| 7,092,014 B1 | 8/2006 | Li et al. | |
| 7,119,832 B2 * | 10/2006 | Blanco et al. | 348/148 |
| 7,129,829 B2 * | 10/2006 | Chan | 340/475 |
| 7,130,745 B2 * | 10/2006 | Sherony | 701/301 |
| 7,161,616 B1 * | 1/2007 | Okamoto et al. | 348/148 |
| 7,266,219 B2 * | 9/2007 | Okamoto et al. | 382/104 |
| 7,274,381 B2 * | 9/2007 | Mojaver et al. | 345/647 |
| 7,412,091 B2 * | 8/2008 | Hack | 382/154 |
| 7,428,000 B2 | 9/2008 | Cutler et al. | |
| 7,463,280 B2 | 12/2008 | Steuart, III | |
| 7,773,121 B1 * | 8/2010 | Huntsberger et al. | 348/218.1 |
| 2001/0013865 A1 * | 8/2001 | Kamei | 345/418 |
| 2003/0227556 A1 * | 12/2003 | Doyle | 348/239 |
| 2004/0075756 A1 * | 4/2004 | Bean et al. | 348/239 |
| 2005/0007459 A1 * | 1/2005 | Kawai et al. | 348/211.99 |
| 2005/0007483 A1 * | 1/2005 | Zimmermann et al. | 348/335 |
| 2005/0018058 A1 * | 1/2005 | Aliaga et al. | 348/239 |
| 2005/0049509 A1 * | 3/2005 | Mansour et al. | 600/476 |
| 2005/0117015 A1 * | 6/2005 | Cutler | 348/38 |
| 2005/0224596 A1 * | 10/2005 | Panopoulos | 239/67 |
| 2006/0070111 A1 * | 3/2006 | Kurosawa | 725/105 |
| 2006/0187305 A1 * | 8/2006 | Trivedi et al. | 348/169 |
| 2006/0215752 A1 * | 9/2006 | Lee et al. | 375/240.08 |
| 2007/0279493 A1 * | 12/2007 | Edanami | 348/148 |

(Continued)

OTHER PUBLICATIONS

Mototaka Suzuki; Jacob van der Blij; Dane Floreano,"Omnidirectional Active Vision for Evolutionary Car Driving" http://infoscience.epfl.ch/record/63997/files/IAS-9.pdf, 2006.

(Continued)

*Primary Examiner* — Alina N. Boutah
(74) *Attorney, Agent, or Firm* — John L. Rogitz

(57) ABSTRACT

A plug-in is provided to a CAD program on a vehicle to permit the CAD program to present an image from a vehicle-mounted video camera that exceeds a 180 degree field of view, even though the core CAD program without plug-in is designed to present no more than a 180 degree field of view image.

18 Claims, 4 Drawing Sheets

U.S. PATENT DOCUMENTS

| | | | |
|---|---|---|---|
| 2007/0297560 A1* | 12/2007 | Song et al. | 378/4 |
| 2008/0018668 A1* | 1/2008 | Yamauchi | 345/633 |
| 2008/0046150 A1* | 2/2008 | Breed | 701/45 |
| 2008/0112610 A1 | 5/2008 | Israelsen et al. | |
| 2008/0129723 A1* | 6/2008 | Comer et al. | 345/419 |
| 2008/0157946 A1* | 7/2008 | Eberl et al. | 340/435 |
| 2008/0189661 A1* | 8/2008 | Gundlach et al. | 715/863 |
| 2009/0027622 A1* | 1/2009 | Lalley et al. | 353/28 |
| 2009/0059005 A1* | 3/2009 | Hattori et al. | 348/148 |
| 2009/0096937 A1* | 4/2009 | Bauer et al. | 348/739 |
| 2010/0033604 A1* | 2/2010 | Solomon | 348/241 |
| 2010/0054580 A1* | 3/2010 | Miyoshi et al. | 382/154 |
| 2010/0073480 A1* | 3/2010 | Hoek et al. | 348/148 |
| 2010/0246669 A1* | 9/2010 | Harel | 375/240.02 |
| 2010/0259632 A1* | 10/2010 | Matsusaka et al. | 348/222.1 |
| 2010/0289899 A1* | 11/2010 | Hendron et al. | 348/148 |
| 2011/0032325 A1* | 2/2011 | Harris | 348/36 |
| 2011/0037725 A1* | 2/2011 | Pryor | 345/174 |
| 2011/0315770 A1* | 12/2011 | Patel et al. | 235/462.01 |
| 2012/0101680 A1* | 4/2012 | Trepagnier et al. | 701/26 |
| 2012/0113209 A1* | 5/2012 | Ritchey et al. | 348/14.02 |
| 2012/0116158 A1* | 5/2012 | Hale et al. | 600/109 |

OTHER PUBLICATIONS

Mark Fiala; David Green; Gerhard Roth; "A Panoramic Video and Acoustic Beamforming Sensor for Videoconferencing", http://www.scs.carleton.ca/~roth/iit-publications-iti/docs/NRC-47364.pdf, Oct. 2004.

* cited by examiner

PLUG-IN TO ENABLE CAD SOFTWARE NOT HAVING GREATER THAN 180 DEGREE CAPABILITY TO PRESENT IMAGE FROM CAMERA OF MORE THAN 180 DEGREES

FIELD OF THE INVENTION

The present invention relates generally to enabling computer-aided design (CAD) image generation systems that cannot produce images of more than 180 degrees to render an image from a camera that can image more than 180 degrees.

BACKGROUND OF THE INVENTION

Video cameras have been provided on the rear ends of vehicles to image the space behind the vehicle. The image is presented on a display in the vehicle that the driver can look at and so ascertain whether any otherwise hidden objects or people are behind the vehicle while, e.g., the driver puts the vehicle in reverse.

As understood herein, it is often the case that the image from the video camera is processed by a computer aided design (CAD) program for presentation on the display. The present invention critically recognizes that many such CAD programs cannot process images of more than 180 degree fields of view, even if a video camera is provided that advantageously can image more than a 180 degree field of view.

SUMMARY OF THE INVENTION

Accordingly, a system includes a vehicle, a camera mounted on the vehicle and generating a camera image having a field of view in excess of 180 degrees, and a processor accessing a computer-aided design (CAD) assembly to generate, from the camera image, a display image with a field of view of more than 180 degrees. A display is mounted in the vehicle and communicates with the processor to present the display image.

In some embodiments the camera may be mounted on a rear of the vehicle or on the front or sides of the vehicle. The display image with a field of view of more than 180 degrees can depict a distorted image of an object in the field of view of the camera.

In some implementations the CAD assembly includes a core module incapable of generating, from the camera image, a display image with a field of view of more than 180 degrees. A plug-in module cooperates with the core module to generate, from the camera image, a display image with a field of view of more than 180 degrees.

If desired, the processor, responsive to the plug-in module, can present on the display a user interface for receiving user input to the processor. The user input can define the field view. The user input can define a horizontal field of view in excess of 180 degrees and/or a vertical field of view in excess of 180 degrees, and it can also define an aspect ratio if desired.

In another aspect, a tangible computer readable storage medium bears instructions that are executable by a processor to receive a camera image having a field of view in excess of 180 degrees, and access a computer-aided design (CAD) assembly to generate, from the camera image, a display image with a field of view of more than 180 degrees. The CAD assembly includes a core module incapable of generating, from the camera image, a display image with a field of view of more than 180 degrees. Also, the CAD assembly includes a plug-in module cooperating with the core module to generate, from the camera image, a display image with a field of view of more than 180 degrees which is presented on a visual display.

In another aspect, a method includes presenting, on a display, a user interface permitting user input representing a camera field of view. The method also includes using the user input to generate a display image from a camera image. The display image has the field of view input from the user interface. The display image, which is characterized by the field of view, is presented on the display.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
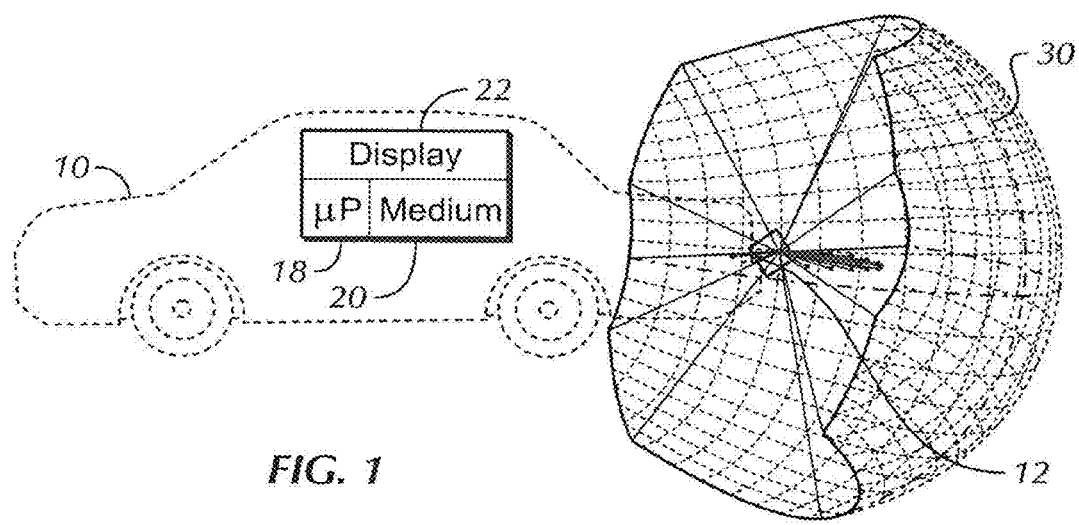
FIG. 1 is a schematic diagram showing a vehicle with camera arid depicting the area imaged by the camera.
Figure 2:
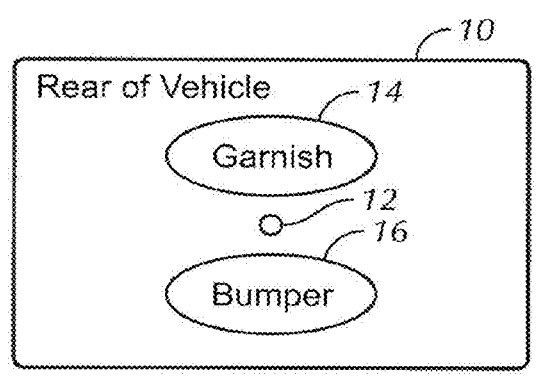
FIG. 2 is rear elevational view of a vehicle showing the camera mounted between the garnish and bumper and body.

Referring initially to FIGS. 1 and 2, a system includes a vehicle 10 on which is mounted one or more cameras such as a video camera 12. In example non-limiting embodiments the video camera 12 may be mounted on the rear of the vehicle unobtrusively between a body garnish 14 and a rear bumper 16. A processor 18 accessing a computer readable storage medium 20 such as disk-based or solid state storage receives camera images from the camera 12 and processes them in accordance with description below to present display images on a display 22, such as but not limited to a flat panel video display.

Figure 3:
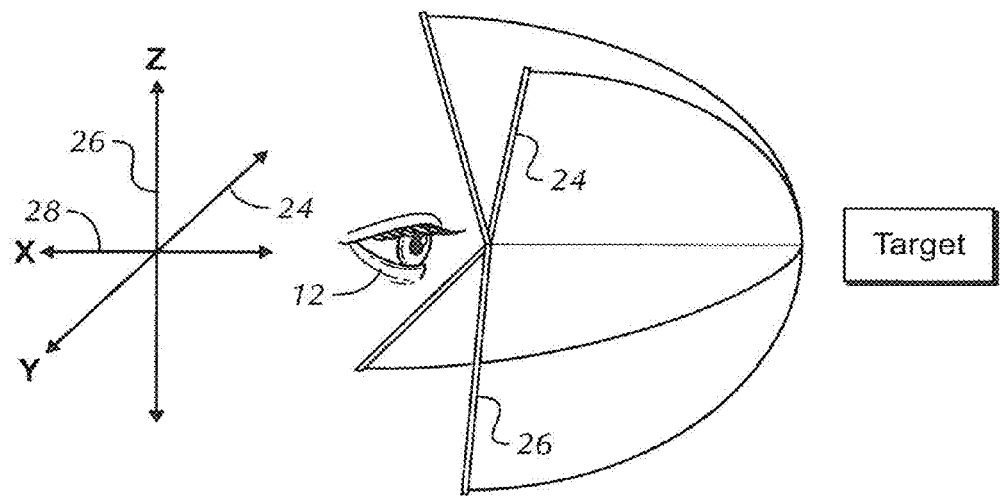
FIG. 3 is a schematic diagram showing the camera, a field of view thereof in excess of 180 degrees, and a coordinate system of an associated computer-aided design (CAD) program.

FIGS. 1 and 3 show that the camera 12 may generate camera images having greater than a 180 degree field of view in the horizontal and/or vertical dimensions 24, 26, respectively. In one non-limiting implementation the dimensions 24, 26 are the Y and Z dimensions, respectively, of a computer-aided design (CAD) program on the medium 20 and executable by the processor 18, with the CAD program also having an X dimension 28 as shown in FIG. 3. Because the camera 12 can generate images with greater than 180 degrees of view, the imaged space 30 (FIG. 1) wraps around the rear of the vehicle 10 as shown.

In one non-limiting implementation, the core module of the CAD program on the medium 20 is configured to generate display images from camera images of less than a 180 degree field of view. The camera 12, however, may be a Sony Automotive camera or other camera that generates a camera view with a field of view of more than 180 degrees as shown in FIGS. 2 and 3, so that using such a high capability camera with a core CAD program that does not support fields of view in excess of 180 degrees results in less than optimal exploitation of the camera capabilities.

Figure 4:
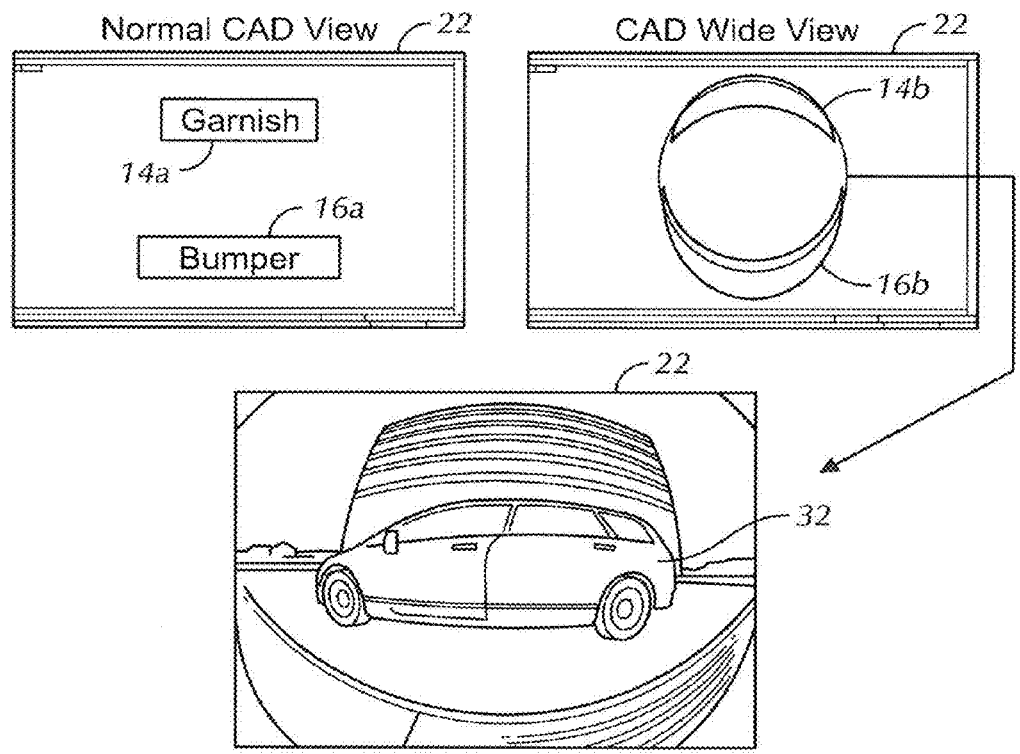
FIG. 4 are three screen shots showing a CAD view of the garnish and bumper of a vehicle without the present plug-in, a CAD view of the garnish and bumper of a vehicle with the present plug-in and, thus, with the garnish and bumper distorted, and a CAD view of the garnish and bumper of a vehicle with the present plug-in as well as a view of an object behind the vehicle.

The result of the above less than optimal exploitation is shown in the first frame of FIG. 4, in which undistorted images 14a, 16a of portions of the garnish 14 and bumper 16 shown in FIG. 1 along with undistorted images of objects behind the vehicle are presented on the display 22. However, portions of the full field of view of the camera 12 are cut off. To give the driver or other occupant of the vehicle 10 the fuller field of view afforded by the camera 12, present principles, explained further below, augment the core CAD module such that distorted images 14b, 16b, 32 of the garnish 14, bumper 16, and other object, respectively, in the camera's field of view are presented on the display 22, as shown in the second and third panels of FIG. 4. Although the images 14b, 16b, 32 are distorted by showing otherwise flat surfaces as being curved, a field of view greater than 180 degrees is presented on the display 22, advantageously affording the driver a wider visualization of what is behind the vehicle.

Figure 5:
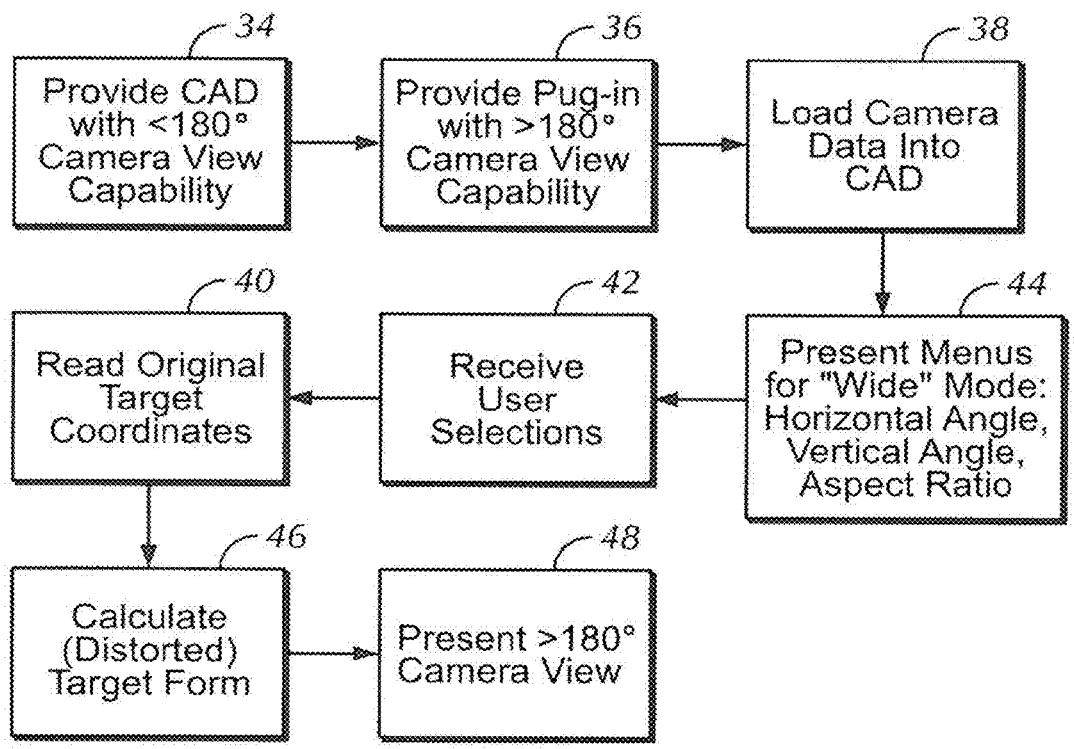
FIG. 5 is a flow chart of example logic in accordance with present principles.

FIG. 5 shows example logic that may be implemented to achieve the above features. Commencing at block 34, a core CAD module is provided that presents images of fields of view of less than 180 degrees. Moving to block 36, a plug-in program is provided to the core CAD module to enable generation of images of fields of view of greater than 180 degrees. The structure of the plug-in is described in ensuing blocks of FIG. 5, in the screen shot of the user interface of FIG. 6, and in the schematic view of modified CAD dimensions in FIG. 7.

Moving to block 38, camera images from the camera 12 are received by the processor 18 and loaded into a CAD data store. Proceeding to block 40, one or more menus or other user interfaces are presented on the display 22 to enable a user to select a "wide angle mode" and then, in that mode, to define vertical and/or horizontal fields of view in excess of 180 degrees, as well as a desired aspect ratio, e.g., 16:9 or 4:3.

Figure 6:
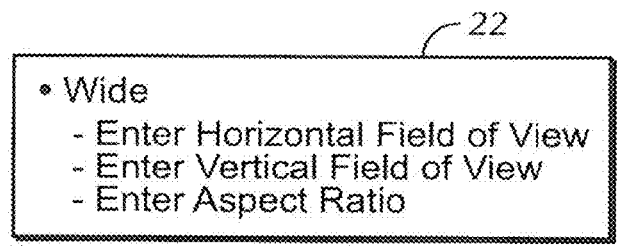
FIG. 6 is a screen shot of an example user interface permitting a user to enter fields of view of the camera along with aspect ratio.

An example UI is shown in FIG. 6. As shown, the UI contains fields for entering, in degrees, vertical field of view, horizontal field of view, and aspect ratio. These fields of view may be the full fields of view provided by the camera 12 or fields of view less than the full fields of view (but generally greater than 180 degrees) as desired by the user. Data entry may be accomplished by a suitable data input device associated with the display 22, e.g., touch screen display sensors, keypads, point-and-click devices, etc.

In an alternate embodiment the fields of view of the camera 12 are automatically sent from the camera 12 to the processor 18 without the need for user input. The aspect ratio is automatically established to be the aspect ratio of the display 22.

Returning to FIG. 5, once the field of view input is received at block 42, the origin and target coordinates are read at block 44. The origin in the CAD program is the camera 12 location and the target location is defined by an image in the field of view of the camera 12. Then, using the fields of view received at block 42, at block 46 a new (distorted) target formk is calculated and presented on the display 22 as a display image having a field of view in excess of 180 degrees at block 48.

Figure 7:
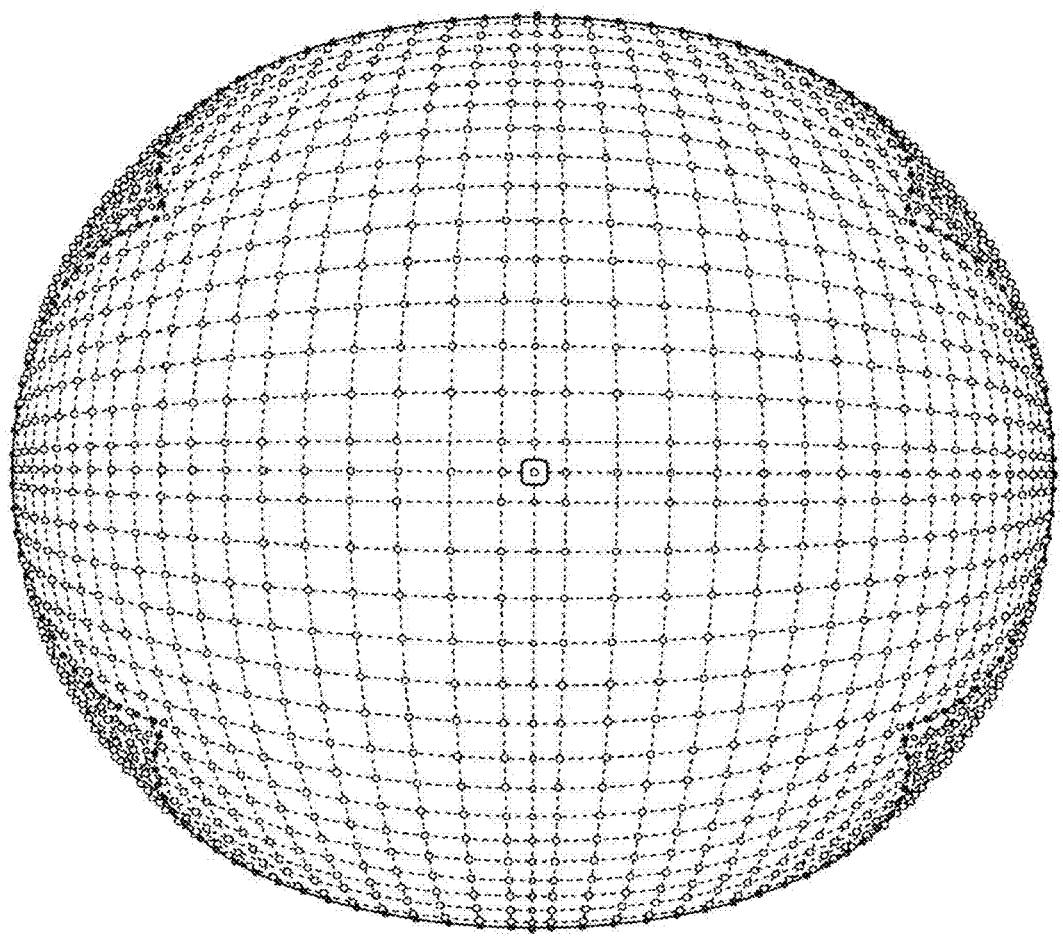
FIG. 7 is a schematic diagram showing how the plug-in warps the dimensions of the core CAD module.

The structure of the plug-in module in undertaking the logic at block 46 can be better understood in reference to FIG. 7. Essentially, using the field(s) of view received at block 42, the plug-in distorts the Y and Z CAD dimensions shown in FIG. 3 to be curved, with more curvature near the outer edges of the dimensions and no distortion at the origin as shown in FIG. 7. The amount of distorting curvature of the CAD dimensions decreases smoothly and continuously from the outer edges toward the origin as also shown. The amount by which the CAD dimensions are distorted may be directly proportional to portion of the field of view that exceeds 180 degrees for the relevant dimension, so that a greater field of view results in greater distortion than a lesser field of view. Once the CAD dimensions are establishes as described, the camera image is distorted to fit the new CAD dimensions, hence resulting in the distorted display images 14b, 16b, 32 shown in FIG. 4. The aspect ratio received at block 42 may similarly be used to establish the distorted Y and Z CAD dimensions in accordance with the above principles.

While the particular PLUG-IN TO ENABLE CAD SOFTWARE NOT HAVING GREATER THAN 180 DEGREE CAPABILITY TO PRESENT IMAGE FROM CAMERA OF MORE THAN 180 DEGREES is herein shown and described in detail, it is to be understood that the subject matter which is encompassed by the present invention is limited only by the claims.

For example, all or parts of the matching circuit 14 may be moved into the integrated circuit of the transceiver. Further, all or parts of the logic of FIG. 3 may be implemented as part of a software routine.

What is claimed is:

1. A system comprising:
   a vehicle;
   a camera mounted on the vehicle and generating a camera image having a field of view in excess of 180 degrees;
   a processor accessing a computer-aided design (CAD) assembly to generate, from the camera image, a display image with a field of view of more than 180 degrees; and
   a display mounted in the vehicle and communicating with the processor to present the display image, wherein the CAD assembly includes a core module incapable of generating, from the camera image, a display image with a field of view of more than 180 degrees, and a plug-in module cooperating with the core module to generate, from the camera image, a display image with a field of view of more than 180 degrees.

2. The system of claim 1, wherein the camera is mounted on a rear of the vehicle.

3. The system of claim 1, wherein the display image with a field of view of more than 180 degrees depicts a distorted image of an object in the field of view of the camera.

4. The system of claim 1, wherein the processor presents on the display a user interface for receiving user input to the processor, the user input defining the field view.

5. The system of claim 4, wherein the user input defines at least one of a horizontal field of view in excess of 180 degrees or a vertical field of view in excess of 180 degrees.

6. The system of claim 5, wherein the user input defines both a horizontal field of view in excess of 180 degrees and a vertical field of view in excess of 180 degrees.

7. The system of claim 5, wherein the user input defines an aspect ratio.

8. A tangible computer readable storage device bearing instructions executable by a processor to undertake logic comprising:
   receiving a camera image having a field of view in excess of 180 degrees;
   accessing a computer-aided design (CAD) assembly to generate, from the camera image, a display image with a field of view of more than 180 degrees, the CAD assembly including a core module incapable of generating, from the camera image, a display image with a field of view of more than 180 degrees, and a plug-in module cooperating with the core module to generate, from the camera image, a display image with a field of view of more than 180 degrees; and presenting the display image on a visual display.

9. The device of claim 8, wherein the medium is mounted in a vehicle.

10. The device of claim 8, wherein the display image with a field of view of more than 180 degrees depicts a distorted image of an object in the field of view of the camera.

11. The device of claim 8, wherein the medium bears instructions to cause the processor to present on the display a user interface for receiving user input to the processor, the user input defining the field view.

12. The device of claim 11, wherein the user input defines at least one of a horizontal field of view in excess of 180 degrees or a vertical field of view in excess of 180 degrees.

13. The device of claim 12, wherein the user input defines both a horizontal field of view in excess of 180 degrees and a vertical field of view in excess of 180 degrees.

14. The device of claim 11, wherein the user input defines an aspect ratio.

15. Method comprising:

presenting, on a display in a vehicle, a user interface permitting user input representing a camera field of view;

using the user input to generate a display image from a camera image, the display image having the field of view input from the user interface; and presenting the display image on the display, the display image being characterized by the field of view, wherein the user input defines an aspect ratio.

16. The method of claim 15, comprising mounting the display in a vehicle.

17. The method of claim 15, wherein the user input defines at least one of a horizontal field of view in excess of 180 degrees or a vertical field of view in excess of 180 degrees.

18. The method of claim 15, wherein the user input defines both a horizontal field of view in excess of 180 degrees and a vertical field of view in excess of 180 degrees.

* * * * *